(12) United States Patent
Yue et al.

(10) Patent No.: US 7,085,313 B2
(45) Date of Patent: Aug. 1, 2006

(54) MULTIPLE CHANNEL JOINT DECODING AT MOBILE HANDSET

(75) Inventors: Lin Yue, San Jose, CA (US); Lin Zhong, Fremont, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 802 days.

(21) Appl. No.: 09/785,888

(22) Filed: Feb. 17, 2001

(65) Prior Publication Data

US 2002/0146064 A1 Oct. 10, 2002

(51) Int. Cl.
*H04B 15/00* (2006.01)
*H04K 1/00* (2006.01)
*H04L 27/30* (2006.01)

(52) U.S. Cl. .................. 375/150; 375/147; 375/142
(58) Field of Classification Search ................ 375/142, 375/143, 144, 148, 150, 152
See application file for complete search history.

(56) References Cited

U.S. PATENT DOCUMENTS

| | | | |
|---|---|---|---|
| 5,506,861 A | 4/1996 | Bottomley et al. | 375/200 |
| 6,385,232 B1 * | 5/2002 | Terashima | 375/149 |
| 6,449,266 B1 * | 9/2002 | Hottinen et al. | 370/342 |
| 6,535,548 B1 * | 3/2003 | King | 375/150 |
| 6,628,702 B1 * | 9/2003 | Rowitch et al. | 375/150 |
| 2002/0009068 A1 * | 1/2002 | Proctor et al. | 370/342 |

OTHER PUBLICATIONS

Alexandra Duel–Hallen: "Decorrelating Decision–Feedback Multiuser Detector for Synchronous Code–Division Multiple–Access Channel" IEEE Transactions on Communications 41 (1993) Feb., vol. 4, No. 2, Feb. 1993, pp. 285–290, XP000392932, NY, USA p. 286, paragraph II; Fig. 1. Revelant to claim No. 1,2.

EP 1 139 576 A (Texas Instruments Inc), Oct. 4, 2001, paragraph [0008]. Relevant to claim No. 1,2.

* cited by examiner

*Primary Examiner*—Phuong Phu

(57) ABSTRACT

A system and method suppresses the interference caused by non-orthogonal signals on multiple channels of the same receiver by applying an inverse of the correlation among the non-orthogonal signals to the decoded signals. In a multi-channel receiver, the receiver is aware of the codes that are allocated to each of the channels, and thus, can be configured to determine the correlation among the multiple codes that are allocated to a receiver. The inverse of this correlation is applied to the output of the correlators assigned to each code, thereby suppressing the effects of using non-orthogonal codes for transmissions to the same receiver. If different sized codes are allocated to the same receiver, the correlation of the shorter code and a corresponding segment of the longer code is computed. The inverse of the correlation for the segment is applied to the output of the correlators, corresponding in time to the processing of the shorter code and this segment of the longer code. The correlation of the shorter code and each shorter-code-length segment of the longer code is similarly determined and its inverse applied to the outputs of the correlators. An output corresponding to the entire longer-length code is determined by combining the intermediate outputs corresponding to each shorter-code-length segment.

11 Claims, 1 Drawing Sheet

MULTIPLE CHANNEL JOINT DECODING AT MOBILE HANDSET

BACKGROUND OF THE INVENTION

1. Field of the Invention

This invention relates to the field of communications, and in particular to CDMA decoding techniques in a multi-channel handset in IS2000.

2. Description of Related Art

Code Division Multiple Access (CDMA) is a commonly used spread-spectrum communications technique wherein an information signal is encoded by one of many code sequences before it is transmitted. The received signal is decoded by the same code sequence to reproduce the original information signal. Transmissions from multiple transmitters can be simultaneously communicated via a common channel by employing different code sequences for each transmitter, provided that the code sequences have particular uniqueness characteristics. The uniqueness characteristics of acceptable codes substantially provide that a coherent output will only be produced when the received signal corresponds to a signal that is encoded using the same code sequence. Each code is orthogonal, or non-correlated, to each other, so that signals that are not encoded using the same code sequence as the decoding code sequence are decoded as noise signals. In a conventional CDMA system, such as a cellular telephone network, the network controller, or base station, allocates and deallocates code sequences on demand, so that each of the transmitters can transmit over the same network without interference from other transmitters.

Conventional CDMA receivers include multiple correlators, each using the same code sequence but at different phase delays. Ideally, only the correlator that is synchronous with the transmitted code would produce a coherent output, and each of the out of phase correlators would decode the received signals as noise. Typically, however, the receiver receives multiple copies of the transmitted signal, at different phases, caused by reflections of the transmitted signal off building and such. The phase differences are caused by the different paths that the reflected signals take from the transmitter to the receiver. This multipath effect is used advantageously by conventional CDMA receivers by combining the outputs of the multiple correlators that receive a reflection of the same transmission, at a different phase.

The use of cellular communications has increased dramatically, and is expected to continue to increase. This increase is associated with an increase in the number of users of cellular communications, as well as an increase in the amount of communications required per user.

With this increased use of cellular communications, the requirement for different codes has increased. The commonly used IS-95 standard, circa 1995, requires the use of 64 bit orthogonal Walsh codes, whereas the newer IS2000 standard, circa 2000, allows the use of both Walsh codes and Quasi-Orthogonal Function (QOF) codes of different lengths. The use of codes of different lengths, and codes that are not necessarily completely orthogonal with every other code has led to an increase in cross-channel interference. In addition to the interference caused by the use of non-orthogonal codes, interference may also occur between codes of different length, because a short code may, for example, be non-orthogonal to particular segments of a longer code.

The increased requirement for communications per user includes the requirement for multiple channels per user handset. For example, handsets are available that provide for the simultaneous communications over a voice channel and a data channel. A conventional multi-channel handset includes multiple correlators, each correlator being operated with a code associated with one of the channels. For example, an example two-channel receiver may contain six correlators, three operating with one code, at different phases from each other (for multipath reception) and three operating with the other code, also at different phases from each other.

The use of non-orthogonal codes also has an adverse effect on receivers that use multiple correlators to overcome, or take advantage of, multipath effects. If a correlator detects a slight correlation, this correlation may be the result of a reflection of the desired signal, and therefore combining its result with the results from other correlators will be beneficial. If, however, the correlation is the result of an other, non-orthogonal, channel's transmission, combining its result with the results from other correlators will be detrimental.

A variety of techniques for overcoming the interference caused by the increased use of non-orthogonal codes are available for use at a base station. U.S. Pat. No. 5,506,861 "SYSTEM AND METHOD FOR JOINT DEMODULATION OF CDMA SIGNALS", issued Apr. 9, 1996 to Bottomley et al, and incorporated by reference herein, presents a scheme for demodulating single and multiple signals in a multipath, time-dispersion environment, with or without taking intersymbol interference into account. This scheme determines each bit, or symbol, value on each of a plurality of channels by minimizing an error function that is based on the totality of channels. The minimization process also includes a dynamic adjustment of filter coefficients within each channel. The complexity of this scheme, however, renders it infeasible for embodiment in a handset, and this scheme does not directly address codes of varying sizes.

BRIEF SUMMARY OF THE INVENTION

It is an object of this invention to provide a receiving system and method for use in a multi-channel handset that reduces the effects of non-orthogonal channel interference. It is a further object of this invention to provide a receiving system and method to facilitate the processing of CDMA codes of different sizes in a multi-channel environment.

These objects, and others, are achieved by providing a system and method that suppresses the interference caused by non-orthogonal signals on multiple channels of the same receiver. Generally, a particular handset is unaware of transmissions to other handsets, and thus cannot efficiently suppress the adverse effects of these transmissions. In a multi-channel receiver, however, the receiver is aware of the codes that are allocated to each of the channels, and thus, can be configured to suppress the effects of the interferences caused by non-orthogonal transmissions of these multiple-channels. The correlation among the multiple codes that are allocated to a receiver is computed, and the inverse of this correlation is applied to the output of the correlators assigned to each code, thereby suppressing the effects of using non-orthogonal codes for transmissions to the same receiver. If different sized codes are allocated to the same receiver, the correlation of the shorter code and a corresponding segment of the longer code is computed. The inverse of the correlation for this segment is applied to the output of the correlators, corresponding in time to the processing of the shorter code and this segment of the longer code. The correlation of the shorter code and each shorter-code-length segment of the longer code is similarly determined and its inverse applied to the outputs of the correlators. An output corresponding to the entire longer-length code is determined by combining the intermediate outputs corresponding to each shorter-code-length segment.

BRIEF DESCRIPTION OF THE DRAWINGS

The invention is explained in further detail, and by way of example, with reference to the accompanying drawings wherein.

Throughout the drawings, the same reference numerals and characters indicate similar or corresponding features or functions.

DETAILED DESCRIPTION OF THE INVENTION

For ease of reference and understanding, this invention is presented using the paradigm of a two-channel CDMA handset, although the principles of this invention are equally applicable to more than two channels, or CDMA systems other than handsets, as will be evident to one of ordinary skill in the art in view of this disclosure.

Figure 1:
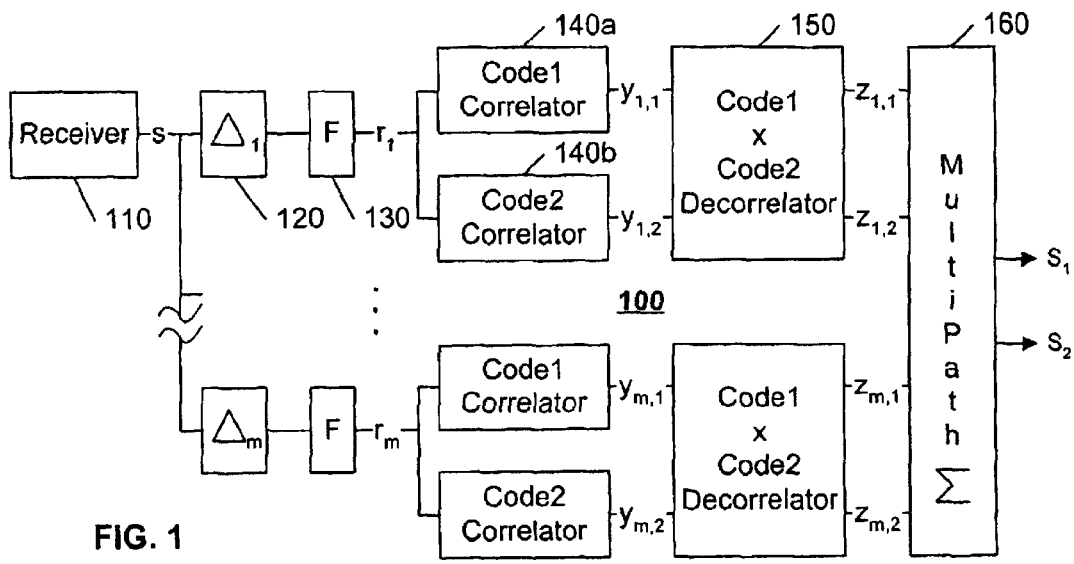
FIG. 1 illustrates an example block diagram of a multi-channel CDMA handset in accordance with this invention.

FIG. 1 illustrates an example block diagram of an example multi-channel (two-channel) CDMA handset 100. At the output of the receiver 110, the received signal can be represented as:

$$\underline{s} = X_1 w_1 \underline{C}_1 + X_2 w_1 \underline{C}_2 + \quad \text{(transmitted signals on each channel)}$$

$$\sum_i (X_1 w_i \underline{C}_1(t-\tau_i) + X_2 w_i \underline{C}_2(t-\tau_i)) + \quad \text{(multipath of transmitted signals)}$$

$$\sum_k \sum_i (X_k w_k \underline{C}_k(t-\tau_i)) + \quad \text{(all paths of all other signals)}$$

$$\underline{n}_o \quad \text{(all other noise)}$$

where $X_c$ is the transmitted information symbol on code-channel c, $w_i$ is the weight, or attenuation, associated with the communications path i, and $\underline{C}_c$ is the channel code c. Depending upon the particular encoding scheme used, the symbol X may be a binary, one-bit, value, or an M-ary, multi-bit value, and is termed a symbol. Because the code is applied to the entire transmitted symbol, the code is represented as a vector $\underline{C}$, as indicated by the underscore. For ease of understanding, equal length codes will be assumed. A technique for processing different length codes is also presented hereinafter.

The received signal is fed to a plurality of decoder paths, or "fingers", each having a different phase delay 120. Within each path i, a filter 130 compensates for the effects of channel weight and other factors, and this filtered signal is applied to correlators 140a, 140b to decode the signals $y_{i,1}$ and $y_{i,2}$ corresponding to the transmitted symbol $X_1$ and $X_2$. Note that, as contrast to a conventional base station that receives multiple transmissions from a variety of asynchronous handsets, the multiple-channel signals $X_1$ and $X_2$ of the same user are synchronous with each other. Thus, the finger that is in sync with one of the channel codes of the transmitted signal, or in sync with one of codes of the multipath reflections of the transmitted signal, will also be in sync with each of the other channel codes. This synchronization is represented by the correspondence of each of the terms $\underline{C}_1$ and $\underline{C}_2$ in the above, and subsequent, equations.

Without loss of generality, the filtered receive signal at the output of a filter 130, after compensation for the channel weight, can be represented as:

$$\underline{r}_i = X_1 \underline{C}_1(t-\tau_i) + X_2 \underline{C}_2(t-\tau_i) + \underline{n} \quad \text{(transmitted signals plus noise)}$$

where the effects of multipath and all other signals and noise factors are included in the noise figure $\underline{n}$, because these are all noise elements to a particular finger.

The output y from a correlator 140 at phase i can be represented as:

$$y_{i,1} = (X_1 \underline{C}_1(t-\tau_i) + X_2 \underline{C}_2(t-\tau_i) + \underline{n}) \cdot \underline{C}_1$$

$$y_{i,2} = (X_1 \underline{C}_1(t-\tau_i) + X_2 \underline{C}_2(t-\tau_i) + \underline{n}) \cdot \underline{C}_2,$$

where · is the inner product. In a multipath decoding system, the outputs y from each finger are combined via a multipath processor 160, and the determination of the symbol value $S_1$ and $S_2$ corresponding to the transmitted symbols $X_1$ and $X_2$ is based on the composite of the outputs $y_{i,1}$ and $y_{i,2}$, using averaging and other techniques, common in the art. If a single finger is used, or if no multipath signals are detected, the output symbols $S_1$ and $S_2$ are based on the single finger outputs y.

If a correlator 140 is in phase with the reference phase, either directly or via a multipath, the output of the correlator can be represented as:

$$y_1 = X_1 + X_2(\underline{C}_2 \cdot \underline{C}_1) + \underline{n} \cdot \underline{C}_1$$

$$y_2 = X_1(\underline{C}_1 \cdot \underline{C}_2) + X_2 + \underline{n} \cdot \underline{C}_2.$$

Note that, if the two codes $C_1$ and $C_2$ are orthogonal, the inner product of the two codes will be zero. Thus, in the absence of noise that is correlated to the CDMA code, and if the two codes are orthogonal, the output y will correspond to the transmitted symbol X.

In a conventional CDMA receiver, the symbol value corresponding to the signal y is determined by comparing the value y to a range of values corresponding to the different symbol values. In the case of a binary signal, the encoding is typically +/−1, corresponding to a logic-high and logic-low value. Thus, in a conventional system, if the output y of the correlator 140 is positive, a logic-high is reported as the determined binary value corresponding to the transmitted signal X; if the output y is negative, a logic-low is reported.

If non-orthogonal codes are used, the inner product of the codes $C_1$ and $C_2$ will not be 0, and each output $y_1$ and $y_2$ will be adversely affected by the signal that is received on the alternate channel, $X_2$ and $X_1$, respectively. If additional channels are provided, and non-orthogonal codes are used, the adverse effects caused by the interference among these channels will increase, due to the non-zero correlation among the codes.

In accordance with this invention, a decorrelator 150 is provided that suppresses the adverse effects caused by the use of non-orthogonal codes. The correlation between the two codes can be represented as:

$$R = \begin{bmatrix} \underline{C_1}\underline{C_1} & \underline{C_1}\underline{C_2} \\ \underline{C_2}\underline{C_1} & \underline{C_2}\underline{C_2} \end{bmatrix}.$$

Note that, because the codes $C_1$ and $C_2$ are known to the multi-channel receiver, this correlation, and its inverse, can be determined at the multi-channel receiver. Note also, that, because the codes are synchronous with each other, the correlation term is independent of phase. The inverse of this determinable correlation is used at the decorrelator 150 to suppress the effects of non-orthogonal codes, to produce a decorrelated set of signals z, as follows:

$$\begin{bmatrix} z_1 \\ z_2 \end{bmatrix} = R^{-1} \begin{bmatrix} y_1 \\ y_2 \end{bmatrix} = R^{-1} \begin{bmatrix} \underline{r} \cdot \underline{C_1} \\ \underline{r} \cdot \underline{C_2} \end{bmatrix}.$$

Each of the signals $z_1$ and $z_2$ is used in accordance to this invention to determine the symbol value corresponding to the transmitted symbol $X_1$ and $X_2$, respectively. That is, for example, if the transmitted signal is a binary +/−1 value, the logic value corresponding to the transmitted symbol X is determined by the sign of the signal z. In a multipath decoding system, the outputs z from each finger are combined, and the determination of the symbol value is based on the composite of these outputs, using conventional multipath decoding techniques.

As illustrated by the equations above, by applying the inverse of the correlation between the codes $C_1$ and $C_2$, the effects caused by the use of non-orthogonal codes $C_1$ and $C_2$ are suppressed. If the codes are, in fact, orthogonal, the correlation between the codes is zero, and its inverse is unity, and the decorrelation operation will have no effect. As also illustrated by the equations above, the correlation matrix and its inverse are not dependent upon phase, nor upon the value of the received symbols, and thus may be computed when the codes are initially allocated, and used therafter for the duration of the received communication on the multiple channels. Note that, because the application of this decorrelation process is an enhancement to the conventionally determined signals y, a unity value for the inverse of R may be applied at the decorrelator 150, while the inverse is being calculated, thereby avoiding any delays in communication if the processor that is used for determining this inverse is relatively slow.

Figure 2:
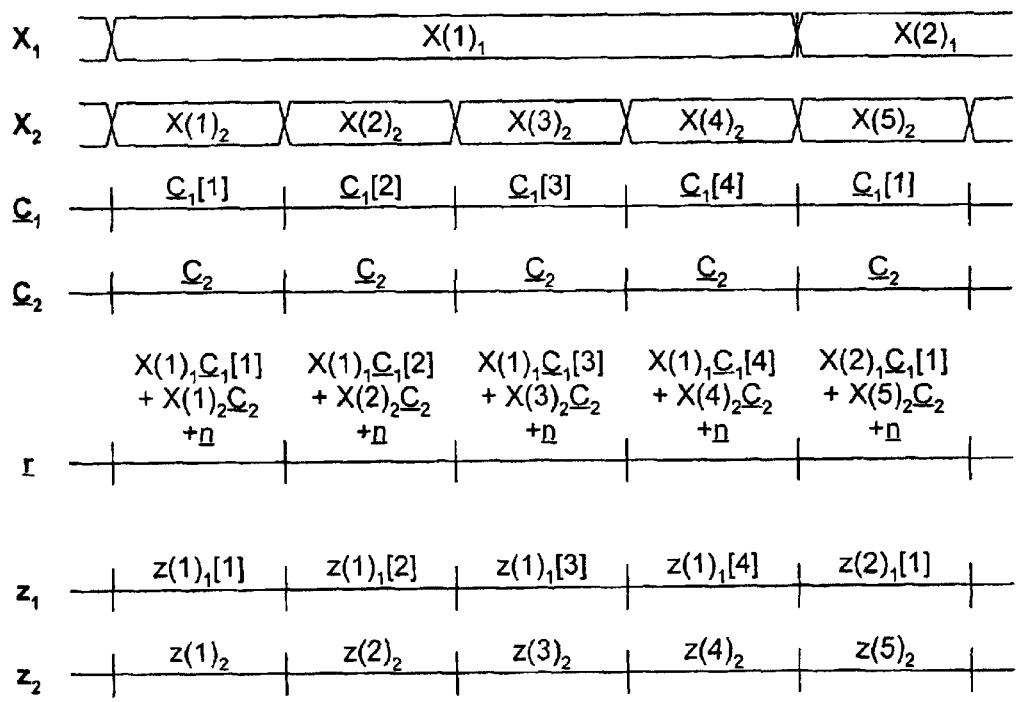
FIG. 2 illustrates a timing diagram corresponding to the processing of codes of different length in accordance with this invention.

FIG. 2 illustrates a timing diagram corresponding to the processing of codes of different length in accordance with this invention. In this example, a first code $\underline{C_1}$ is four times as long as second code $\underline{C_2}$. The input symbols $X_1$ that are encoded via the first code $\underline{C_1}$ are correspondingly four times as long as input symbols $X_2$ that are encoded via the second code $\underline{C_2}$. That is, four symbols $X_2$ are communicated for each symbol $X_1$. In FIG. 2, each sequential symbol X is identified, as X(1), X(2), X(3), and so on. In the span of symbol $X(\mathbf{1})_1$, four shorter symbols, $X(\mathbf{1})_2$, $X(\mathbf{2})_2$, $X(\mathbf{3})_2$, and $X(\mathbf{4})_2$, occur. When the next symbol on the first channel, $X(\mathbf{2})_1$, commences, the fifth shorter symbol, $X(\mathbf{5})_2$, commences. The longer code $\underline{C_1}$ is illustrated as four segments $\underline{C_1}[\mathbf{1}]$ $\underline{C_1}[\mathbf{2}]$ $\underline{C_1}[\mathbf{3}]$ and $\underline{C_1}[\mathbf{4}]$, each segment being the same length as the shorter code $\underline{C_2}$.

In accordance with this invention, signal values y are produced at each interval j,j=1,4, corresponding to the shorter code $\underline{C_2}$, as follows:

$$\begin{bmatrix} y_1[j] \\ y_2[j] \end{bmatrix} = \begin{bmatrix} \underline{r}[j] \cdot \underline{C_1}[j] \\ \underline{r}[j] \cdot \underline{C_2} \end{bmatrix}.$$

A correlation between the codes can be represented as:

$$R[j] = \begin{bmatrix} \underline{C_1}[j]\underline{C_1}[j] & \underline{C_1}[j]\underline{C_2} \\ \underline{C_2}\underline{C_1}[j] & \underline{C_2}\underline{C_2} \end{bmatrix};$$

that is, the correlation at each segment is defined as the correlation between the shorter code and each corresponding segment of the longer code. This segment-specific correlation is used to suppress the effects of the non-orthogonality of the shorter code and the segments of the longer code at the decorrelator 150 as follows:

$$\begin{bmatrix} z_1[j] \\ z_2[j] \end{bmatrix} = R[j]^{-1} \begin{bmatrix} y_1[j] \\ y_2[j] \end{bmatrix} = R[j]^{-1} \begin{bmatrix} \underline{r}[j] \cdot \underline{C_1}[j] \\ \underline{r}[j] \cdot \underline{C_2} \end{bmatrix}.$$

The output value $z_2$ at each interval ($z(\mathbf{1})_2$, $z(\mathbf{2})_2$, $z(\mathbf{3})_2$, $z(\mathbf{4})_2$, $z(\mathbf{5})_2$, etc.) corresponds to a different input signal $X_2$ ($X(\mathbf{1})_2$, $X(\mathbf{2})_2$, $X(\mathbf{3})_2$, $X(\mathbf{4})_2$, $X(\mathbf{5})_2$, etc.). Because the $\underline{C_1}$ extends across four time intervals j, each of the four output values $z_1[j]$ form a segment of the output value $z_1$ corresponding to the four-segment wide input signal $X_1$. That is, $z(\mathbf{1})_1$ [j,j=1,4] corresponds to $X(\mathbf{1})_1$, $z(\mathbf{2})_1[j,j=1,4]$ corresponds to $X(\mathbf{2})_1$, and so on. Note that, because each of the four segments of the output $z_1$ corresponds to the same input value $X_1$, any of the output values $z_1[j]$ can be used to determine the corresponding input signal $X_1$. In accordance with this invention, the determination of the input signal $X_1$ is based on a composite of the individual output values $z_1[j]$ corresponding to each segment of the code $\underline{C_1}$. In the binary case, for example, the sign of the sum of the values $z_1[j]$ may be used to determine the output symbol. In an M-ary encoding, the average of the values $z_1[j]$ may also be used. Alternatively, each output segment $z_1[j]$ may be used to provide a symbol, and a voting scheme may be used to select the composite of the segments corresponding to the input symbol $X_1$. In a multipath decoding system, the composite outputs z from each finger are combined via the multipath processor 160, and the determination of the symbol value is based on the composite of these outputs, using conventional multipath decoding techniques, such as a weighted average.

Note that, although the use of segments of a longer code to decode corresponding segments of an information signal is presented in the context of the use of a decorrelator 140 to suppress the effects of a correlation between a shorter code and each segment, this technique may also be applied independent of the decorrelator 140. That is, for example, to reduce memory requirements, or to reuse designs that are configured for a shorter code, longer codes can be processed via the segmented decoding technique detailed above. Similarly, the size of the segments need not be constrained to a length of a code. Preferably, a segment should not extend across a boundary between two information symbols, and this can be achieved by selecting a segment length that is a common multiple of each of the code lengths.

The foregoing merely illustrates the principles of the invention. It will thus be appreciated that those skilled in the art will be able to devise various arrangements which, although not explicitly described or shown herein, embody the principles of the invention and are thus within its spirit and scope. For example, although specific delay blocks 120 are illustrated, the input stream of bits may be contained in a continuous shift register, and the different fingers are configured to merely extract the bits from different segments of the shift register. In like manner, although a multi-fingered embodiment is illustrated for processing multipath signals, a single-fingered embodiment may also be used. These and other system configuration and optimization features will be evident to one of ordinary skill in the art in view of this disclosure, and are included within the scope of the following claims.

We claim:

1. A CDMA receiving system comprising:

a receiver that is configured to receive a composite signal that includes a plurality of information signals, a first correlator, operably coupled to the receiver, that is configured to decode a first information signal from the composite signal, based on a first CDMA code, to produce a first output signal, a second correlator, operably coupled to the receiver, that is configured to decode a second information signal from the composite signal, based on a second CDMA code, to produce a second output signal, and a decorrelator, operably coupled to the first correlator and the second correlator that is configured to determine a first output value and a second output value corresponding to the first information signal and the second information signal, respectively, based on the first output signal, the second output signal, and a correlation between the first CDMA code and the second CDMA code.

2. The system of claim 1, further including:

at least one other correlator, operably coupled to the receiver and to the decorrelator, that is configured to decode at least one other information signal from the composite signal, based on at least one other CDMA code, to produce an at least one other output value, wherein the decorrelator is further configured to determine the first output value, the second output value, and at least one other output value, corresponding to the first information signal, the second information signal, and the at least one other information signal, respectively, based on the first output signal, the second output signal, the at least one other output signal, and a correlation among the first CDMA code, the second CDMA code, and the at least one other CDMA code.

3. The system of claim 1, wherein the composite signal is represented as r, and the first code and second code are represented as C1 and C2, respectively, the first output signal y1, and the second output signal y2 are determined as:

$$\begin{bmatrix} y1 \\ y2 \end{bmatrix} = \begin{bmatrix} r \cdot C1 \\ r \cdot C2 \end{bmatrix};$$

the correlation R is determined as:

$$R = \begin{bmatrix} C1C1 & C1C2 \\ C2C1 & C2C2 \end{bmatrix};$$

the first output value z1 and second output value z2 are determined as:

$$\begin{bmatrix} z1 \\ z2 \end{bmatrix} = R^{-1} \begin{bmatrix} y1 \\ y2 \end{bmatrix}.$$

4. The system of claim 1, further comprising:

a plurality of fingers, each finger corresponding to a different phase delay, and each configured to provide an intermediate first output value and second output value corresponding to the phase delay of the finger, and a multipath processor, wherein a first finger of the plurality of fingers includes the first correlator, the second correlator, and the decorrelator, such that the first output value and second output value correspond to the first intermediate output value and second intermediate output value of the first finger, each of the other fingers also includes an other first correlator, an other second correlator, and an other decorrelator, and the multipath processor determines a first output symbol and a second output symbol based on the intermediate first output values and second output values of the plurality of fingers.

5. The system of claim 1, wherein
the correlation between the first CDMA code and the second CDMA code is independent of a phase of the first and second CDMA code.

6. The system of claim 1, wherein
the correlation between the first CDMA code and the second CDMA code is independent of the first information signal and the second information signal.

7. The system of claim 1, wherein
the first CDMA code has a first length that is longer than a second length of the second CDMA code, and
the correlation between the first CDMA code and the second CDMA code is based on correlations of segments of the first CDMA code and the second CDMA code.

8. The system of claim 7, wherein
the first correlator is configured to decode the first information signal by decoding segments of the composite signal corresponding to the second length, to produce segmented decodings based on the segments of the first CDMA code, and
the decorrelator is configured to determine the first output value by combining the segmented decodings corresponding to the first length.

9. A method for decoding a composite signal comprising:

determining a plurality of correlation outputs corresponding to a correlation between the composite signal and each of a plurality of CDMA codes, determining a correlation matrix corresponding to a correlation among each of the plurality of CDMA codes, and determining a plurality of output value, each output value corresponding to each of the plurality of CDMA codes, based on the plurality of correlation outputs and an inverse of the correlation matrix.

10. The method of claim 9, wherein the correlation matrix is independent of a phase of the plurality of CDMA codes.

11. The method of claim 9, wherein the correlation matrix is independent of the composite signal.

* * * * *